United States Patent
Pettigrew

[11] Patent Number: 5,867,913
[45] Date of Patent: Feb. 9, 1999

[54] FOUR SQUARE CORNER HOLE SAW

[76] Inventor: David Danson Pettigrew, 24747 Lakeview Dr., Union City, Pa. 16438

[21] Appl. No.: 813,236

[22] Filed: Feb. 20, 1997

[51] Int. Cl.$^6$ .................................................. B27B 19/00
[52] U.S. Cl. ............................. 30/500; 30/369; 30/503.5; 144/363; 83/618
[58] Field of Search .................................. 30/369, 166.3, 30/371–372, 393, 503.5, 503, 502, 500; 144/363; 83/745, 751, 618; 408/24, 25, 26

[56] References Cited

U.S. PATENT DOCUMENTS

| | | | |
|---|---|---|---|
| 3,302,674 | 2/1967 | Russell | 30/372 |
| 3,503,294 | 3/1970 | Vinciguerra et al. | 83/618 |
| 3,713,217 | 1/1973 | Frederick et al. | 30/372 X |
| 5,031,324 | 7/1991 | Berghauser et al. | 30/502 X |

*Primary Examiner*—Douglas D. Watts

[57] ABSTRACT

My interest was aroused by the lack of any power tool to help the electrical contractor cutting rectangular holes through walls for his wall boxes for switches and receptacles. I started making a model in 1992 only to find out there was no parameters to follow for the specifications the thrust needed. To push four saw blades were one problem to solve. The fact that the unit would require a rigid attachment to the wall was another problem to solve. The small rectangular hole gave little room to work. The last problem to solve was about 12 inches of simultaneously sawing. By Thanksgiving time of 1996 my fourth model was finished. I had the surprise to discover that I was able to saw a rectangular hole of two inches by four inches in 1/2 inch plasterboard in about ten seconds and in plywood, less than one minute!

This could be an excellent item for the mobile home builder to cut the holes in the walls. He would welcome this saw.

The housing contractor and his electrician, I believe, will have to resort to simple wooden gauges to accurately locate boxes in the studding exactly and this saw, I propose to use height rods and a horizontal type gauge to find that box behind the wall.

When this device is accepted and patented, it will be my seventeenth patent (I worked for Delta MFG. in Mtailwaukee, Wis., until 1952, and Rockwell in Pittsburgh, Pa., until 1971). I have been in retirement since 1977.

7 Claims, 5 Drawing Sheets

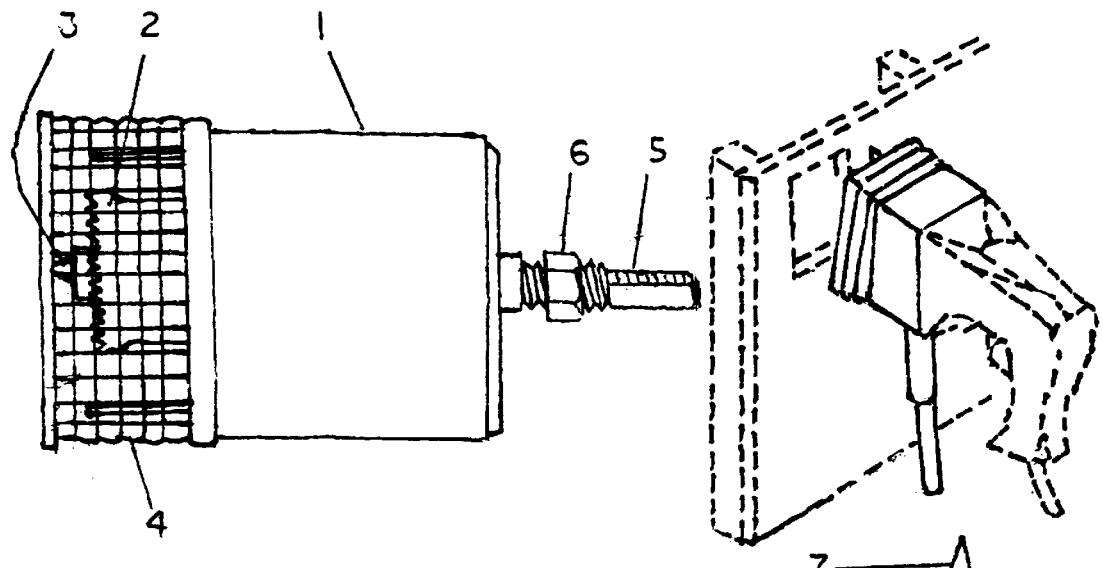
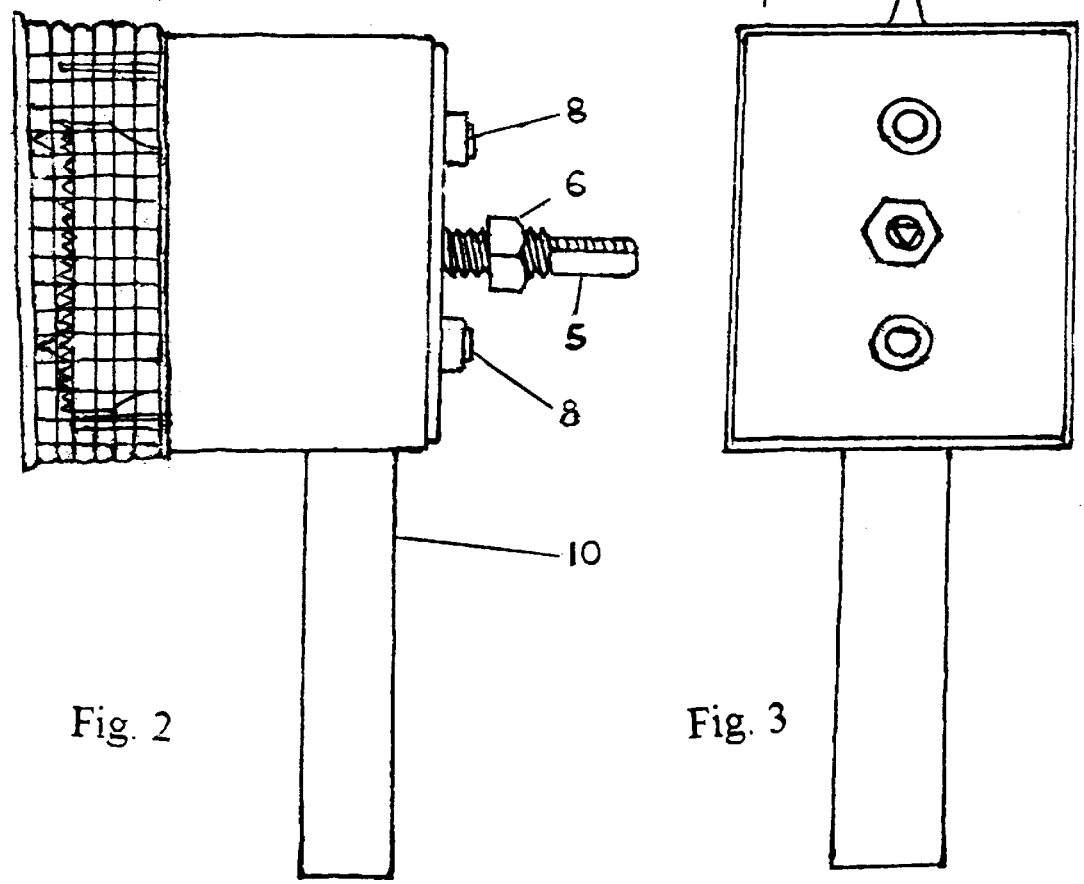

FOUR SQUARE CORNER HOLE SAW

Said device is a single purpose saw that cuts small square corner rectangular holes approximately 2¼ by 3⅝ inches; having means to alter position of and or replace blades. Four straight saw blades arranged in a rectangular configuration that has the blades reciprocally actuated by a standard hand drill. The saw unit contains all necessary gears, shafts, cams, and so forth to maintain a positive stationary position when held against the wall while sawing a rectangular hole in said wall. The rectangular hole is used for accepting electrical boxes that hold switches and receptacles. The device has a handle, guard, pointers, and means for holding simple gauges, if desired as aids in operating. The device and its handle and the hand drill require the use of two hands to operate and thus enabling safety.

FIELD OF THE INVENTION

This invention is a single purpose, multi-blade saw for the use by electrical contractors to cut rectangular holes in "sheet rock" [plaster]. The invention relates to a new, faster method for electrical contractors to saw small rectangular holes for installing switch and receptacle used in house and building constructions. The contractor can perform in seconds that which now takes minutes. By marking vertical center line on the wall locating the placement for said box and using other aids such as the pointer on the device and a dowel rod inserted into the handle of the said device, a fast and accurate job can be performed. This invention is a new concept for operation reciprocally two pair of straight saw blades positioned at right angles to each other.

BACKGROUND OF INVENTION

A number of years ago, I researched a number of various sales outlets for an item available for use to cut or saw the rectangular hole available for electrical contractors to install the boxes for light switches and receptacles in building construction. Not having found any, I proceeded to build one myself.

To start, a hard wood model was made. It proved only the cam operating the pair of blades was feasible, in theory. Next, a sandwiched construction of sheet metal of reasonable thickness failed when pressure was applied to penetrate the work piece, plaster dusts froze the mechanism and the sleeve bearings on the shaft. The vibration caused by the reciprocating, motion forced the steel balls to fall away. The steel balls were added to help eliminate the friction and sticking.

Avoiding the failures and using the successes in the third design I finally reached the wall with the blades, following the entry of the single pilot drill being used as a stabilizer. However, this design failed because the drill, which was rotating, immediately end-milled its hole to a larger diameter, because the saw blades touched and dug into the plaster and remained stationary. This proved the need to avoid the kickback by maintaining a stationery position of the body of the device to enable the saw blades to operate correctly.

Finally, two drills were used to stabilize the unit, and they were not rotating when the saw blades were engaged in the work piece. Experiments showed it was necessary to maintain a stationary position first to enable the saw blades to operate successfully. Swing arms replaced the use of steel balls for anti-friction purposes. The position of the swing arms as attached to the lower cover of the gearbox is critical; they must be to an offset position to create the downward thrust for the chopping action along with the sawing action allowing the device to move swiftly through the material.

Along the way, the introduction of rocker arms to operate the short saw blades was a success, no attempt was made to design a formed circular cam since this saw is for "rough cutting of material". Therefore, the eccentric and sealed bearing provided the force necessary to move four saw blades at once.

The rectangular hole size is selected by checking sizes of most boxes now offered on the market. However, by use of shims or moving of the saw blade position and the type of saw teeth custom fitting can be obtained.

BRIEF DESCRIPTION OF THE DRAWINGS

IN THE ACCOMPANYING DRAWINGS, IN WHICH THE SAME REFERENCE CHARACTERS IN DIFFERENT FIGURES INDICATE LIKE PARTS.

On each page of accompanying drawings:

Sheet 1 has an isometric view of the invention in operating position
  FIG. 1 four square corner hole saw shown with guard
  FIG. 2 side view of said saw with guard with handle, input shaft, and stop nut
  FIG. 3 top view of said saw and guard and handle, pointer; location of section (AA)

Figure 4:
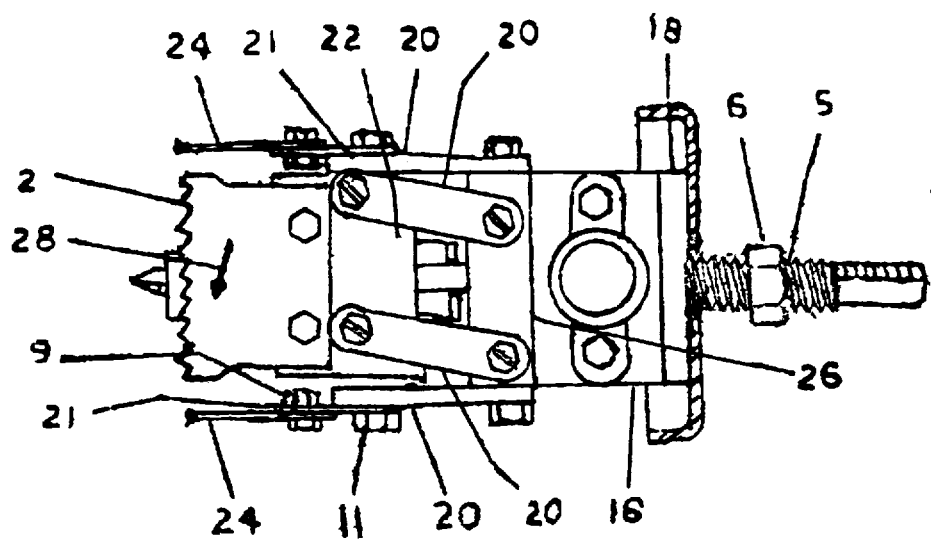
Figure 5:
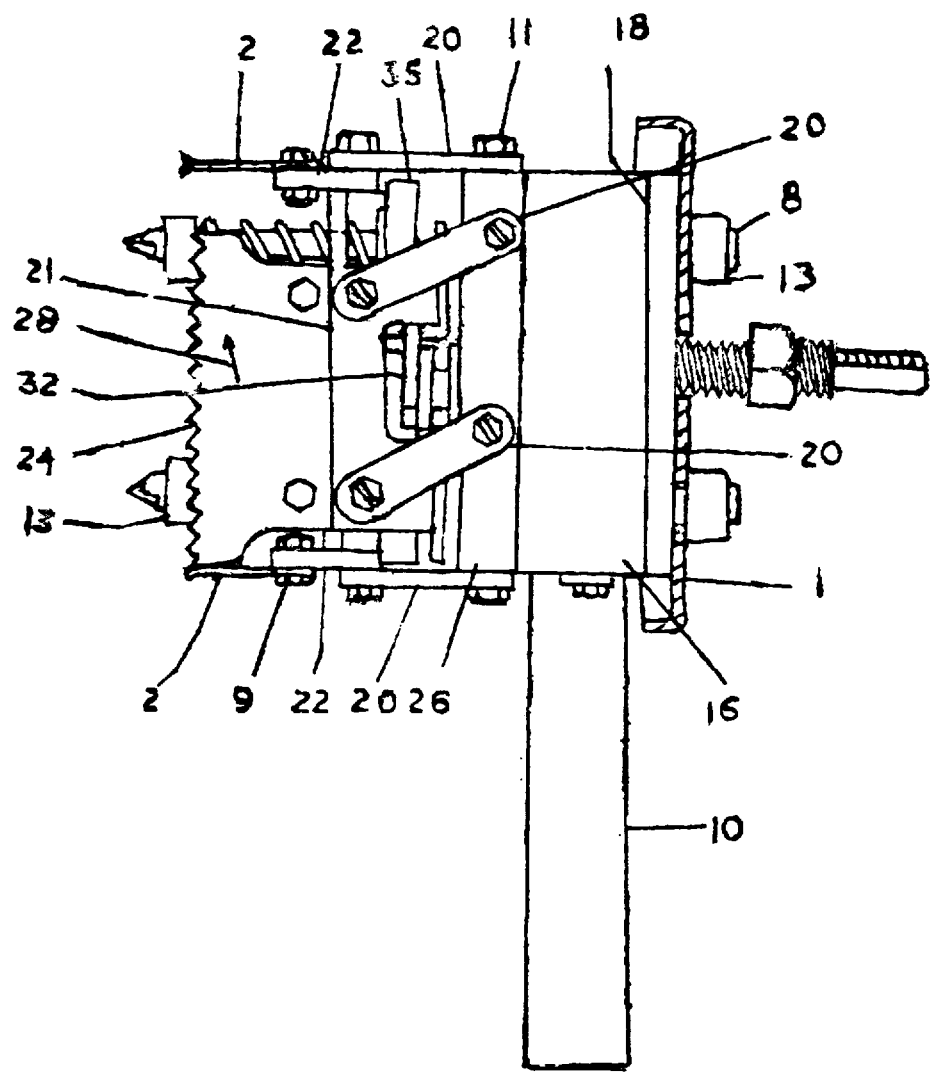
Figure 6:
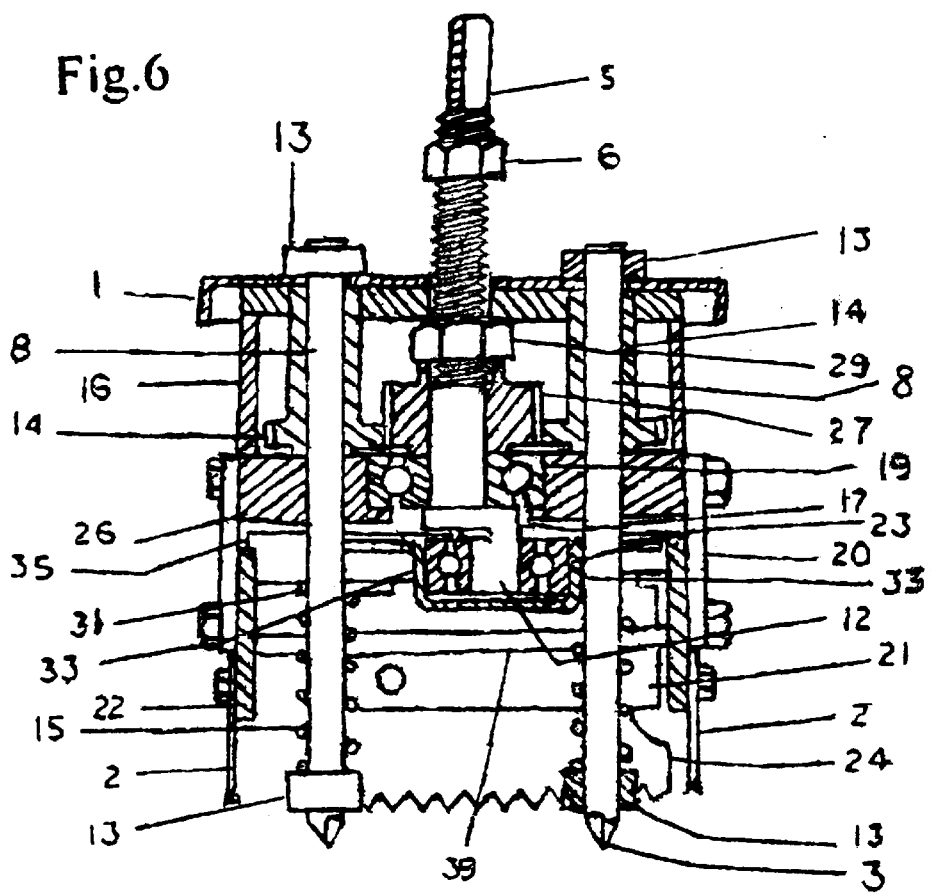
Figure 7:
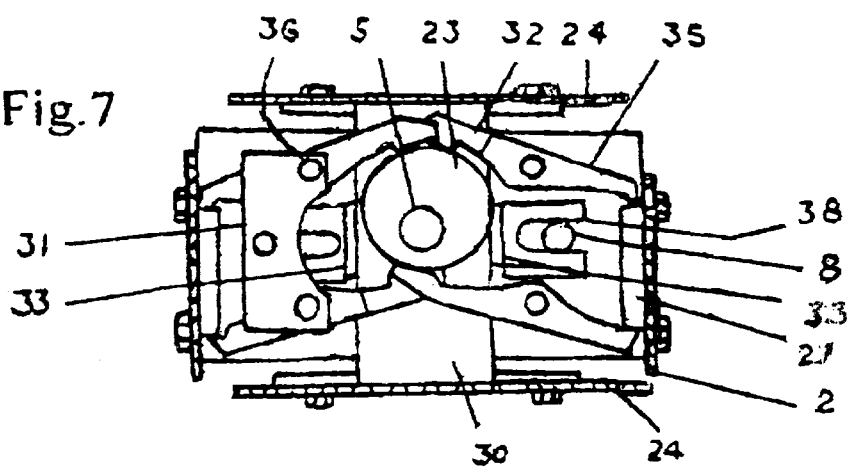
Figures 8, 9:
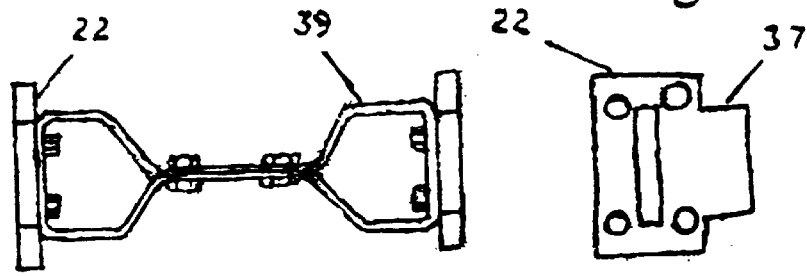

Sheet 2
  FIG. 4 similar to FIG. 1 with guard wrap removed leaving only top portion of guard intact
  FIG. 5 similar to FIG. 3 with guard wrap removed Sheet 3
  FIG. 6 a cross section through centerline of FIG. 3, sheet 1, showing shafts and gears, etc.
  FIG. 7 bottom view of invention exposing rocker arms and short saw blade assembly
  FIG. 8 showing cross section bar tying the two short saw blade brackets together
  FIG. 9 side view of short saw blade bracket with saw blade removed Sheet 4
  FIG. 10 an isometric drawing of long saw blade bracket showing cam faces and guide slots
  FIG. 11 an isometric view of the rocker arms showing the overlapping clearance necessary at eccentric area
  FIG. 12 an isometric view of spring retainer
  FIG. 13 the shape of the short saw blades
  FIG. 14 the shape of the long saw blades Sheet 5
  FIG. 15 the exploded view showing the guard and the frame with saw and saw brackets relatively positioned
  FIG. 16 the exploded view showing the relative position of the drive shaft end rocker arms and stabilizer shafts

SPECIFICATIONS

This patent design covers the faster method of sawing four square corner holes.

The three figures on page one shows top view (FIG. 1), side view (FIG. 2), and front view (FIG. 3). Also shown is an isometric sketch of the square hole saw positioned against a typical wall.

The top view of said rectangular hole saw (FIG. 1), shows a guard design that permits the operator of this four square corner hole saw to see where the said saw is placed and has a means of dust and chip exiting through the lower position of the guard (4). The upper guard (1) extends over the top of the mechanism to the upper portion of the short saw blade (2) that is visible (on drawing). From that position down, the lower guard is an open screen (4) to the end of the stabilizer shaft (8), which is a spade drill point (3). To the right of FIG. 1 is the input end (5) of the drive shaft with an adjustable threaded nut (6). In FIG. 2 the adjustable nut is seen between the stabilizing shafts (FIG. 2–8); it is used to limit the depth of sawing. In FIG. 2, a handle (10) for holding the unit to the wall with a holding means for a dowel rod that would extend from the handle to the floor to accurately gauge the rectangular hole saw's height from the floor as shown in the isometric view. Referring to FIG. 3 is a pointer (7) centrally located on the top of the guard (1), also shown in FIG. 2, item 7. See the sketch of the four square corner hole saw in working position near a section of wall showing a rectangular hole the saw just completed. The saw is shown with an integral power source (as an option).

Referring to the drawings (FIGS. 4&5) on page two, are shown with the wrap around guard, shown in FIG. 1 (1), has been removed leaving only the top portion intact in FIGS. 4, 5, and 6 exposing the working mechanism from the gearbox assembly down to the saw blades. In FIGS. 4 and 5 are shown the means by which the saw blades are assembled to the gearbox (16). The gearbox (16) consists of the top cover (18) and the bottom cover (26) spaced apart and fastened in (FIGS. 4&5, respectively) by means. The saw blades both long and short and their brackets are assembled to the lower cover plate (26) of the gearbox (16) by the use of the swing arms (20).

Referring to FIG. 4, we see the facing side of the short saw blade (2) as assembled to the narrow end of the gearbox (16) by the swing arms (20), which are pivoted by means of shoulder bolts (11) to the bottom cover (26) of the gearbox (16). Said swing arms are extended down from the gearbox and are pivotally attached to the brackets (22), which also secures the short saw blades (2) by standard nut and bolt assembly (9).

Referring to FIG. 5, we see the end view of the two short saw blade assemblies (22'). These assemblies are positioned on each side of the long saw blade assembly (21&24) (on drawing). Here we see short saw blades (2) are assembled to the brackets (22) by means (9). The swing arms that are pivoted to the said bracket (22, on the topside). And we see that the upper portion of said swing arms are also pivoted by means to the narrow end of the bottom cover plate (26).

Figure 10:
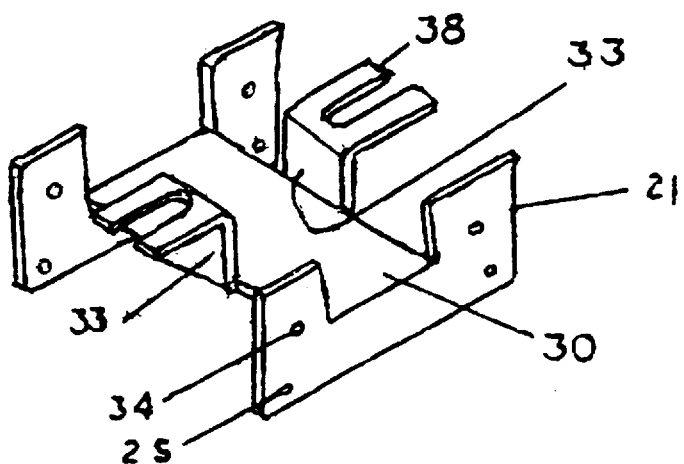

FIG. 5 also shows the similar assembly of the facing side of the long saw blade assembled to the long blade (24) bracket and spacer assembly (21). FIG. 10 on page 4 shows the details of this bracket (21) and how the long saw blades are assembled to the U-shaped bracket on the bottom row of bolt holes (25). It also shows how the swing arms (20) are fastened to the upper row of bolt holes (34) on said bracket by shoulder bolts (11, FIG. 4).

Thus referring to FIG. 4, we see the end view of the long saw blades (24) assembled to the brackets (21) by means (9), and the tops of the swing arms (24) are pivoted to the bottom cover (26) on the long side of the bottom cover (26).

The pair of swing arms in FIG. 5 (20), in the position shown, forms a parallelogram with a cover plate (26) and a bracket (21). When said swing arms move upward (on drawing) by means of the rotation of the eccentric (12; FIG. 6) rotating 180-degrees, the assembly forms a rectangular configuration of their mounting. As the input shaft (5) is rotated 180-degrees, the above-described action takes place.

Thus keeping the long saw blades (24) parallel to the bottom cover (26) so that the blade (24) cuts the work piece for its entire length. Also, as the swing arms swing downward (on drawing), the blades axe moved across the work piece ½-inch and into the work surface about 3/32-inch.

The drive shaft (5; FIG. 6) has a ¼-inch eccentric at the lower end (17) which is located in an enlarged diameter of said drive shaft with eccentric means for a stub shaft means (12) machined to fit a ball bearing (23) with a light press fit. Said spacer/bracket (21) has two-cam faces (33) that straddle the eccentric ball bearing (23) with a sliding fit.

In FIG. 4, referring to the short saw blades the pair of swing arms (20) is shown in the position that forms a parallelogram. When said pair of swing arms are moved downward by means, they form a rectangle. The resulting action of the short saw blades is exactly the same as that of the long saw blades where the stroke of the long saw blade it is ½-inch across the (wall) and 3/32-inch into the (wall).

The reciprocal action of the saw blades operate sequentially as follows: as the ball bearing (23) moves clockwise through the fourth quadrant, the saw blade (24) of FIG. 5 will move toward the wall and cuts in an upward motion. The short saw blade (2) moves upward and to the left. As said bearing (23) goes through the third quadrant, the saw blade (24) proceeds in cutting to its full depth of 3/32-inch, while the short saw blade (2) reverses direction and approaches the wall. When said bearing goes through the second quadrant (clockwise), the long saw blade goes back and upward, while the saw blade (2) proceeds to cut to a depth of 3/32-inch. As the eccentric (24) goes through the first quadrant, the long saw blade (24) finishes backing up and the saw blade (2) reverses its direction and backs up half way.

The direction of the plunge is shown on each saw blade by an arrow (FIGS. 4–28&5–28.).

Drawing number 3 shows how the rotary motion of the drive shaft is translated into sequential reciprocal motion of the two pair of saw blades, and the use of passing through the dead center of the eccentric stud (12) (FIGS. 6&7) with its bearing (23) in contact with the cam face (33) on the bracket (21) and rocker arms (35). This increases the force needed to move four saw blades across approximately twelve inches of the wall surface.

The drawings on page 3 shows FIG. 6 as a cross section (see "AA" on FIG. 3, drawing 1). In FIG. 6 is shown two drill/stabilizer shafts (FIG. 8), each have collars (13) above the point on spade drill at the bottom end (8) placed ⅜-inch up from the drill point (3). The other collars (13) on top of guard (1) along with the gear hub (14) underneath keep the guard (FIG. 6 in place.

The two-drill/stabilizer shafts' (8) midsections pass through the gearbox (16). A gear with a long hub (14) is fastened to the stabilizer shafts with means for adjustment as follows:

a. set lower end of the gear (14) is 3/16-inch above (or out of mesh with) drive shaft gear (27)

b. set bottom of lower collar (13) even with saw teeth (when fully extended downward).

A compression spring (6–15) with about eight pounds of tension is above each bottom collar (13) on the stabilizer shafts (8).

The lower end (3) of the stabilizer shafts is pointed and grooved 3/16-inch to become a 60-degree spade drill point for left-hand rotation.

FIG. 6 shows that the drive shaft passing through the larger ball bearing (19) is a thrust bearing for the drive shaft (5) and said bearing is pressed-fit in a counter-bore of the bottom cover plate (26) of the gearbox (16).

In FIG. 6, it shows that above the bearing (19) on the drive shaft (5) is a drive gear (27) keyed to shaft (5) with a wide tooth face to permit coaxial travel while drilling with the drill/stabilizer shafts (8). Said gears (14) are meshed with the drive shaft gear (27) to rotate and drill until the lower collars (13) come into contact with the work surface at which time the further movement of the gearbox shifts and moves the gears out of mesh to stop the drilling.

The drive shaft (5) is an assembly of the depth stop nut (6) and a plain nut (29) that secures the gear (27) and the ball bearing (19). The drive shaft (5) actuates the eccentric stud (12) and the ball bearing (23) to move the cam faces (33) of the bracket (21) and the long saw blades (24) reciprocally from left to right.

The axial force placed against the thrust bearing (19) moves the entire saw assembly of four reciprocating saw blades down along the two stabilizing shafts (8) which rotate until the points of the stabilizer shafts (8) have pieced the wall and the lower collars (13) have reached the work-piece (wall) surface, At this position, the gears (14) have been axially shifted out of mesh with the gear (27) on the drive shaft (5). This leaves only the four saw blades reciprocating until the top of the long hubs of the gears (14), which are now motionless, push upwards under the top of the guard (1). The stop nut (6) on the drive shaft (5) stop the downward thrust of the shaft (5), the rectangular hole has been made, and the job is done.

Reference to FIG. 7 shows how the long said blades are actuated from a rotating eccentric/bearing. The pair of long saw blades (24) a long with bracket/spacer (21 see FIG. 10-drawing #4) are moved reciprocally from left to right [on drawing] by the eccentric action of the bearing (23) which is in contact at cam faces (33) of the channel on the web (30) of the bracket (21). Slots (38) FIGS. (7&10) on each end of the bracket (21) to guide this assembly by straddling the stabilizer shafts (8) FIG. 7).

The pair of short saw blades (2) are moved up and down [on drawing] (FIG. 7) simultaneously by the use of rocker arms (35) that cam over the outer ball bearing race of ball bearing (23). The rocker arms (35) pivot about the stud (36), which is rigidly held by the bottom cover plate (26) of the gearbox (FIG. 6). The studs (36) have means of retairing the rocker arm (35; such as a cotter pin and washer). The outer end of the rocker arm (35) makes contact with the bracket (22) at point (37; FIG. 9) the short saw blade (2) assemblies FIG. 7). This bracket (22) is thick enough to accommodate the sliding required at notch (37; FIG. 9). Item 39 (FIG. 6&8) is the tie bar (web plate) between the short saw blade brackets (22). Item 17 (FIG. 7) is the enlarged end of the input shaft (5; FIG. 6).

Referring to FIG. 7, the rocker arms (35) extend past one another where they cam over the ball bearing (23). Because the center distance varies between the rocker arm pivot (36) to the eccentric movement of the ball bearing (23) on the eccentric (12) of the enlarged boss on the bottom of the drive shaft (5), the rocker arms (35) must reach past each other, hence a reduction of width at place of interference as shown in FIG. 7 (32) and FIG. 11 (sheet 47 item 35).

FIG. 10 on sheet 4 shows the design of the combination spacer for the long saw, blades (24) and the cam face (33, FIG. 7) that spans the eccentric bearing (23) and the guide slots (38) that straddle the drill/stabilizer shafts (8) for guiding the long saw blade assembly. The top row of holes on the isometric drawing (FIG. 10–34) are for the swing arm use the top row holes (34). The bottom row (25) for the long saw blades (FIG. 5–24).

It is the eccentric on the drive shaft that reciprocates the brackets and by positioning the swing arms to obtain a horizontal position (on drawing) that causes the saws to "chop saw". To obtain the chop-saw action in move the mid point between pivot locations on the bottom cover (26) over ¼-inch from the transverse and longitudinal centerline of the drive shaft (5).

Note that all pivot spacing is identical for each of the two ends of the bottom plate (26). Said pivot spacing of the cover plate must be used for the bracket (22) and to the saw blade (2; as seen on FIG. 4).

Likewise, all of the pivot spacing is identical for each of the two sides of the bottom plate (26). Said pivot spacing is carried from the side of the cover plate (26) to the bracket (21) and to the saw blade (24; as seen on FIG. 5).

Figure 11:
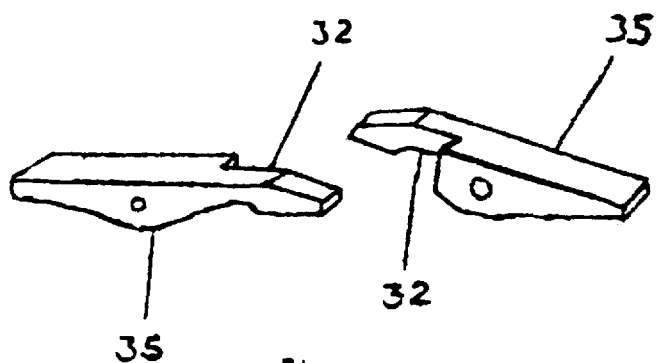

FIG. 11 is an isometric drawing of rocker arms (35) which show the overlap (32) design.

Figure 12:

FIG. 12 shows the spring retainer (31) can be used to retain rocker arms.

Figure 13:
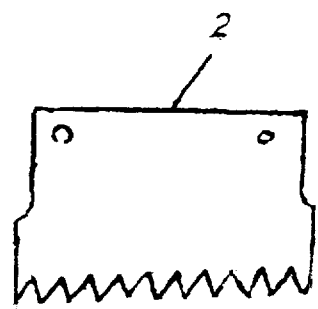

FIG. 13 shows the small saw blade (2) length of saw is ½inch shorter than the rectangular hole's width .

Figure 14:
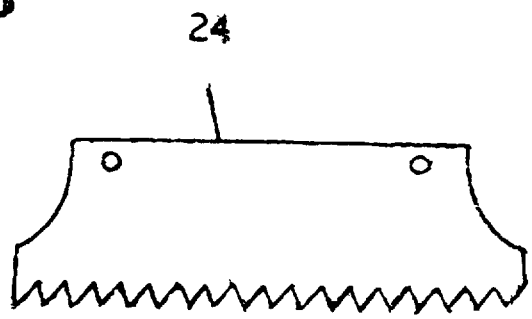
Figure 15:
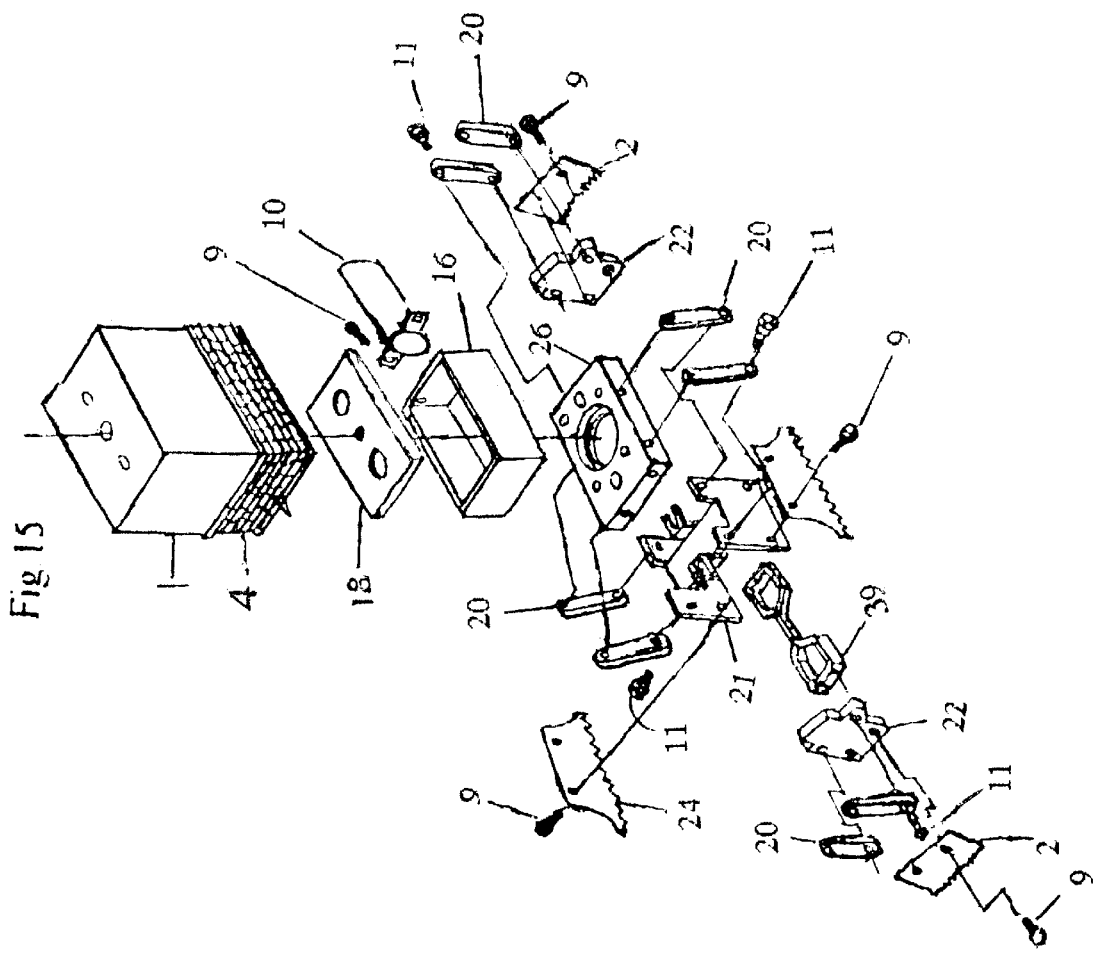

FIG. 14 shows the long saw blade (24) length of saw is the inch shorter than the rectangular hole's width, FIG. 15 is the exploded view of the guard, the gearbox, the bottom cover plate, and showing the location of the four saw blades and their brackets and swing arms in relative position.

Figure 16:
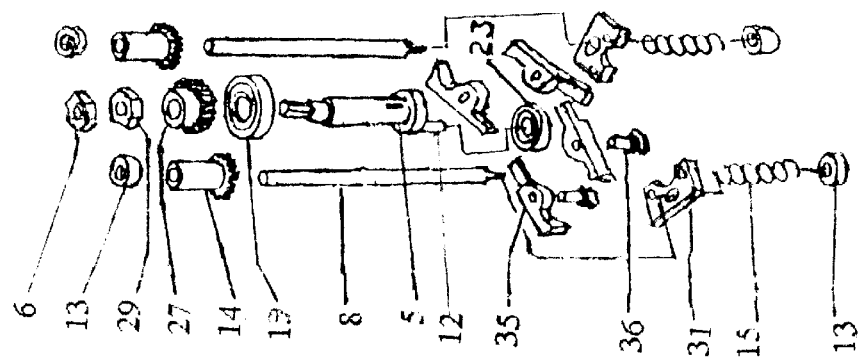

FIG. 16 shows the drive shaft, stabilizers, eccentric with gears, and showing the location of the swing arms in their relative positions.

The above-described embodiments, of course, are not to be construed as limiting the breadth of the present invention. Modifications, and other constructions, will be apparent which are in the spirit and scope of the invention as defined in the appended claims.

I claim:

1. A saw for cutting rectangular holes in a relatively planar work piece comprising: a frame having a drive shaft rotationally mounted therein, the drive shaft being connectable to a hand drill at one end and having eccentric cam means mounted on the other end, two motion transmitting means mounted in the frame and connected to the cam means into reciprocating motion, the motion transmitting means also being connected to two pairs of saws to reciprocate each pair of saws simultaneously in one direction and then in reverse direction, the pairs of saws being at right angles to each other and operating to cut the rectangular hole, and shaft means on the frame to fix the position of the frame with respect to the work piece.

2. The saw of claim 1 wherein the stabilizing shaft means is comprised of at least one reciprocally mounted shaft with a pointed end.

3. The saw of claim 2 wherein the shaft or shafts are mounted to be normal to the plane of the work piece.

4. The saw of claim 1 wherein each pair of saws is comprised of two straight blades mounted to reciprocate along the length of the blades.

5. The saw of claim 1 wherein the eccentric cam means is a circular cam mounted eccentrically with respect to the driveshaft.

6. The saw of claim 5 two pairs of pivoting cams transmit the rotating motion of the cam to two of the saws.

7. The saw of claim 5 wherein a channel shaped piece is mounted for sliding motion with respect to said frame and transmits the rotary cam motion to reciprocate two of the saws.

* * * * *